US009876916B1

(12) United States Patent
Casio (10) Patent No.: US 9,876,916 B1
(45) Date of Patent: Jan. 23, 2018

(54) IMAGE FORMING APPARATUS THAT IMAGE-FORMS RESULT OF PROOFREADING PROCESS WITH RESPECT TO SENTENCE

(71) Applicant: KYOCERA Document Solutions Inc., Osaka (JP)

(72) Inventor: Archer Casio, Oaska (JP)

(73) Assignee: KYOCERA Document Solutions Inc., Tamatsukuri, Chuo-ku, Osaka (JP)

(*) Notice: Subject to any disclaimer, the term of this patent is extended or adjusted under 35 U.S.C. 154(b) by 0 days.

(21) Appl. No.: 15/335,802

(22) Filed: Oct. 27, 2016

(30) Foreign Application Priority Data

Oct. 19, 2016 (JP) ................................. 2016-205567

(51) Int. Cl.
| | | |
|---|---|---|
| G06K 15/00 | (2006.01) | |
| H04N 1/00 | (2006.01) | |
| G06K 9/00 | (2006.01) | |
| G06K 9/68 | (2006.01) | |
| G06F 3/12 | (2006.01) | |

(52) U.S. Cl.
CPC ..... *H04N 1/00037* (2013.01); *G06K 9/00442* (2013.01); *G06K 9/6885* (2013.01); *H04N 1/00068* (2013.01); *H04N 1/00092* (2013.01); *H04N 1/00204* (2013.01); *H04N 1/00795* (2013.01); *G06K 2209/01* (2013.01)

(58) Field of Classification Search
CPC .......... H04N 1/00037; H04N 1/00068; H04N 1/00092; H04N 1/00204; H04N 1/00795; G06K 9/00442; G06K 9/6885; G06K 2209/01; G06F 17/2223; G06F 17/28; G06F 17/273

USPC ...................................... 358/1.1–1.18; 704/9
See application file for complete search history.

(56) References Cited

U.S. PATENT DOCUMENTS

| | | | | |
|---|---|---|---|---|
| 6,085,206 | A * | 7/2000 | Domini ................. | G06F 17/273 715/257 |
| 6,205,261 | B1 * | 3/2001 | Goldberg ................. | G06K 9/03 382/187 |
| 6,424,983 | B1 * | 7/2002 | Schabes ................ | G06F 17/273 704/9 |
| 8,341,520 | B2 * | 12/2012 | Iakobashvili ......... | G06F 17/273 715/257 |

(Continued)

FOREIGN PATENT DOCUMENTS

JP        2000-194695 A        7/2000

*Primary Examiner* — Gabriel Garcia
(74) *Attorney, Agent, or Firm* — IP Business Solutions, LLC (57) ABSTRACT

An image processing apparatus incorporated in an image forming apparatus includes a data acquisition unit, a proofreading processing unit, and an image generating unit. The data acquisition unit acquires data to be proofread representing sentences that are targets of proofreading. The proofreading processing unit proofreads the data to be proofread acquired by the data acquisition unit, and detects an erroneous writing including an error, and a regular notation representing a correct form of the erroneous writing. The image generating unit synthesizes an image representing the erroneous writing and the regular notation detected through the proofreading process performed by the proofreading processing unit with the data to be proofread, to thereby generate a proofreading result image.

4 Claims, 9 Drawing Sheets

(56) References Cited

U.S. PATENT DOCUMENTS

| | | | |
|---|---|---|---|
| 2011/0313757 A1* | 12/2011 | Hoover | G06F 17/274 704/9 |
| 2012/0078616 A1* | 3/2012 | White | G06F 3/0237 704/9 |
| 2013/0246048 A1* | 9/2013 | Nagase | G06F 17/2223 704/9 |

* cited by examiner

| RATIO | SCORE |
|---|---|
| LESS THAN 5% | A+ |
| 5% OR MORE, LESS THAN 8% | A |
| 8% OR MORE, LESS THAN 11% | B |
| 11% OR MORE | C |

Fig.5  TR1

The Pain of Missing Someone You Never Had..

Those who has survived this cruel phenomenon of fate told tales gruelling, incomprehensible straggle.

According to them, livung the days was like sleeping in glass.

No one deserve such a distasteful predicament yet many seem to subconsciously gravitate.

Fig.6

The Pain of Missing Someone You Never Had..
Those who [has] survived this cruel phenomenon of fate told
tales [gruelling], incomprehensible [straggle].
According to them, [livung] the days was like sleeping [in] glass.
No one [deserve] such a distasteful predicament[ ]yet many
seem to subconsciously gravitate.

---

NAME OF DOCUMENT: COMPOSITION
OWNER OF DOCUMENT: Taro Kyoto
TOTAL NUMBER OF SENTENCES: 4
TOTAL NUMBER OF WORDS: 46
NUMBER OF GRAMMATICAL ERRORS: 3
NUMBER OF WORD SPELLING ERRORS: 3
NUMBER OF PUNCTUATION ERRORS: 1
TOTAL NUMBER OF ERRORS: 7
RATIO OF NUMBER OF GRAMMATICAL ERRORS TO TOTAL NUMBER OF SENTENCES: 0.75(75%)
RATIO OF NUMBER OF SPELLING ERRORS TO TOTAL NUMBER OF WORDS: 0.07(7%)
RATIO OF TOTAL NUMBER OF ERRORS TO TOTAL NUMBER OF WORDS: 0.15(15%)
SCORE: C
DATE: 2016.9.16

Fig.7

IMAGE FORMING APPARATUS THAT IMAGE-FORMS RESULT OF PROOFREADING PROCESS WITH RESPECT TO SENTENCE

INCORPORATION BY REFERENCE

This application claims priority to Japanese Patent Application No. 2016-205567 filed on Oct. 19, 2016, the entire contents of which are incorporated by reference herein.

BACKGROUND

The present disclosure relates to an image processing apparatus and an image forming apparatus, and in particular to a proofreading process with respect to sentences.

Apparatuses configured to proofread documents, for example to check spelling mistakes in a document written in English, have been proposed. For example, a document processor is known that identifies only alphanumeric strings assumed to have been inputted as English words by a user, and checks the spelling mistake.

SUMMARY

The disclosure proposes further improvement of the foregoing technique.

In an aspect, the disclosure provides an image processing apparatus including a data acquisition unit, a proofreading processing unit, and an image generating unit.

The data acquisition unit acquires data to be proofread representing sentences that are targets of proofreading.

The proofreading processing unit proofreads the data to be proofread acquired by the data acquisition unit, and detects an erroneous writing including an error, and a regular notation representing a correct form of the erroneous writing.

The image generating unit synthesizes an image representing the erroneous writing and the regular notation detected through the proofreading process performed by the proofreading processing unit with the data to be proofread, to thereby generate a proofreading result image.

In another aspect, the disclosure provides an image forming apparatus including the image processing apparatus and an image forming unit.

The image forming unit forms the proofreading result image generated by the image generating unit, on a recording medium.

DETAILED DESCRIPTION

Figure 1:
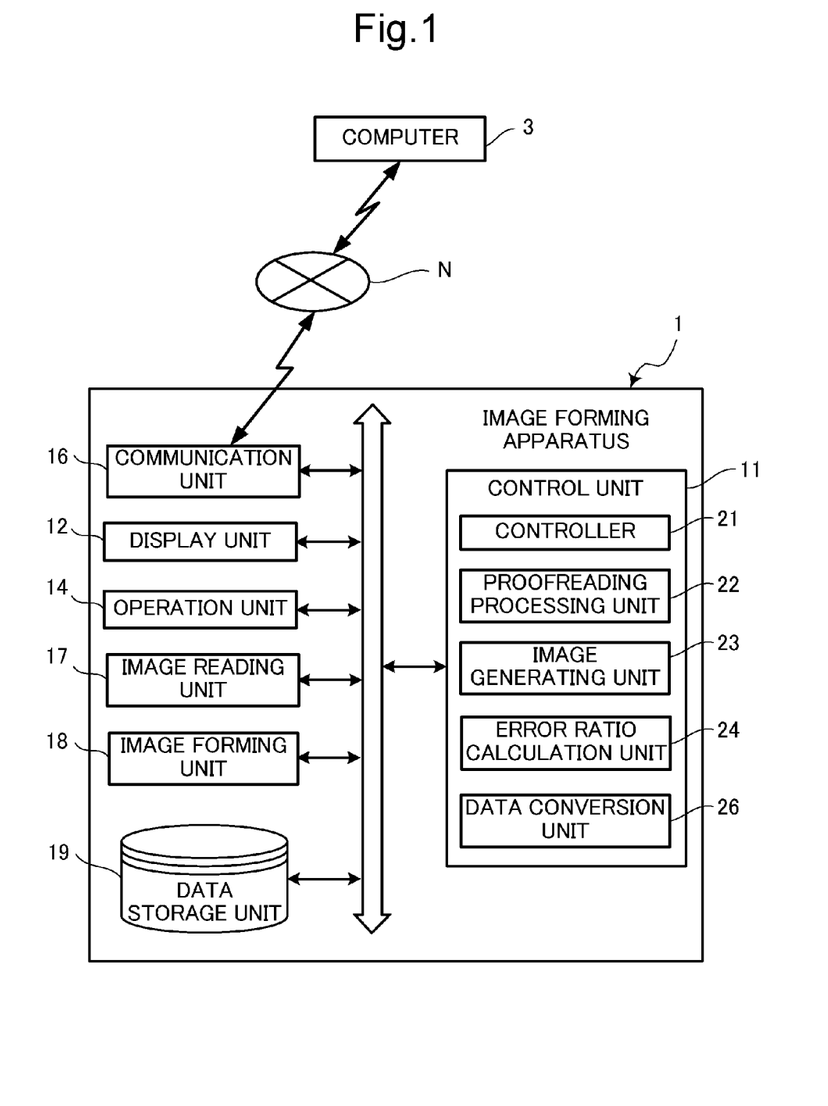
FIG. 1 is a block diagram showing an electrical configuration of an image forming apparatus including an image processing apparatus according to an embodiment of the disclosure.

Hereafter, an image processing apparatus and an image forming apparatus according to an embodiment of the disclosure will be described with reference to the drawings. FIG. 1 is a block diagram showing an electrical configuration of the image forming apparatus including the image processing apparatus according to an embodiment of the disclosure.

The image forming apparatus 1, including the image processing apparatus according to an embodiment of the disclosure includes a control unit 11, a display unit 12, an operation unit 14, a communication unit 16, a data storage unit 19, an image reading unit 17, and an image forming unit 18. These functional units are configured to transmit and receive data and signals to and from each other, through a bus.

The display unit 12 is, for example, constituted of a liquid crystal display (LCD) or an organic light emitting diode (OLED) display.

The operation unit 14 is an input device composed of a keyboard, a mouth, and so forth and used to input operation instructions of the user.

The communication unit 16 includes a communication module to serve as a communication interface, and transmits and receives data to and from a computer 3, through a network N such as a LAN.

The image reading unit 17 includes a scanner that optically reads a document transported by an automatic document feeder or placed on a contact glass, and acquires a source image based on the image data acquired through the document reading of the scanner.

The image forming unit 18 includes a photoconductor drum, a charging device that uniformly charges the surface of the photoconductor, an exposure unit that exposes the surface of the photoconductor drum to light thereby forming a static latent image on the surface of the photoconductor drum, a developing unit that develops the static latent image on the surface of the photoconductor drum into a toner image, and a transfer unit that transfers the toner image on the surface of the photoconductor drum onto a recording medium such as a recording sheet, and forms an image based on the files stored in the data storage unit 19 or the source image acquired by the image reading unit 17, on the recording sheet.

The data storage unit 19 is constituted of, for example, a hard disk drive (HDD). The data storage unit 19 stores therein the document to be proofread as will be subsequently described. Examples of such document include a document file made up by a word processor application, a spreadsheet made up by a spreadsheet software, a file containing image data of the jpeg or bmp format, and so forth.

The control unit 11 includes a processor, a random-access memory (RAM), and a read-only memory (ROM). The processor is, for example, a central processing unit (CPU), MPU, or ASIC. The control unit 11 acts as a controller 21, a proofreading processing unit 22, an image generating unit 23, an error ratio calculation unit 24, and a data conversion unit 26, when the processor executes an image processing program stored in the data storage unit 19. The controller 21, the proofreading processing unit 22, the image generating unit 23, the error ratio calculation unit 24, and the data conversion unit 26 of the control unit 11 may each be set up as a hardware circuit, instead of being realized through the operation based on the control program.

The controller 21 controls the overall operation of the image forming apparatus 1.

The proofreading processing unit 22 proofreads the data to be proofread acquired by the image reading unit 17 through document reading, and detects an erroneous writing including an error, and a regular notation expressing the correct form of the erroneous writing, with respect to the sentences and words constituting the data to be proofread.

The proofreading processing unit 22 contains dictionary data composed of, for example regarding English sentences, types of English words (distinction among nouns, verbs, adjectives, articles, and distinction between singular and plural), grammatical rules, and the spelling of English words. For example regarding Japanese sentences, the proofreading processing unit 22 contains dictionary data containing information such as usage rules of homonyms, reading aid rules, and typographical error rules. The proofreading processing unit 22 performs the proofreading including analyzing the words included in the data to be proofread and deciding whether an error is present in the words and the use thereof.

In this embodiment, it will be assumed that the proofreading process performed by the proofreading processing unit 22 includes spelling error check of English words, grammatical error check, and punctuation error check. However, the proofreading processing unit 22 may perform at least one of the spelling error check of English words, the grammatical error check, and the punctuation error check, as proofreading process.

The proofreading processing unit 22 also detects the cause of the erroneous writing detected through the proofreading process. For example, the proofreading processing unit 22 identifies the type of violation of the rules on the basis of the grammatical rules included in the dictionary rules, with respect to the sentences and words included in the data to be proofread, and decides that the violation is the cause of the erroneous writing. At this point, the image generating unit 23 sets up a proofreading result image, by synthesizing the image representing the cause of the erroneous writing detected by the proofreading processing unit 22 with the image representing the erroneous writing. Here, the proofreading processing unit 22 may also perform the proofreading process in accordance with a known English error check software (e.g., an application provided in an open source).

The image generating unit 23 forms images representing the erroneous writing and the regular notation detected through the proofreading process performed by the proofreading processing unit 22, and synthesizes such images with the data to be proofread, thereby setting up the proofreading result image representing the result of the proofreading process performed by the proofreading processing unit 22.

The error ratio calculation unit 24 calculates the ratio of the number of erroneous writings to the total number of words included in the data to be proofread by the proofreading processing unit 22. The image generating unit 23 further synthesizes the image representing the ratio calculated by the error ratio calculation unit 24 with the data to be proofread, to generate the proofreading result image.

The data conversion unit 26 converts the source image based on the image data acquired by the image reading unit 17 into text data, for example through an OCR process. The proofreading processing unit 22 performs the proofreading process with respect to the text data converted by the data conversion unit 26.

Figure 2A:
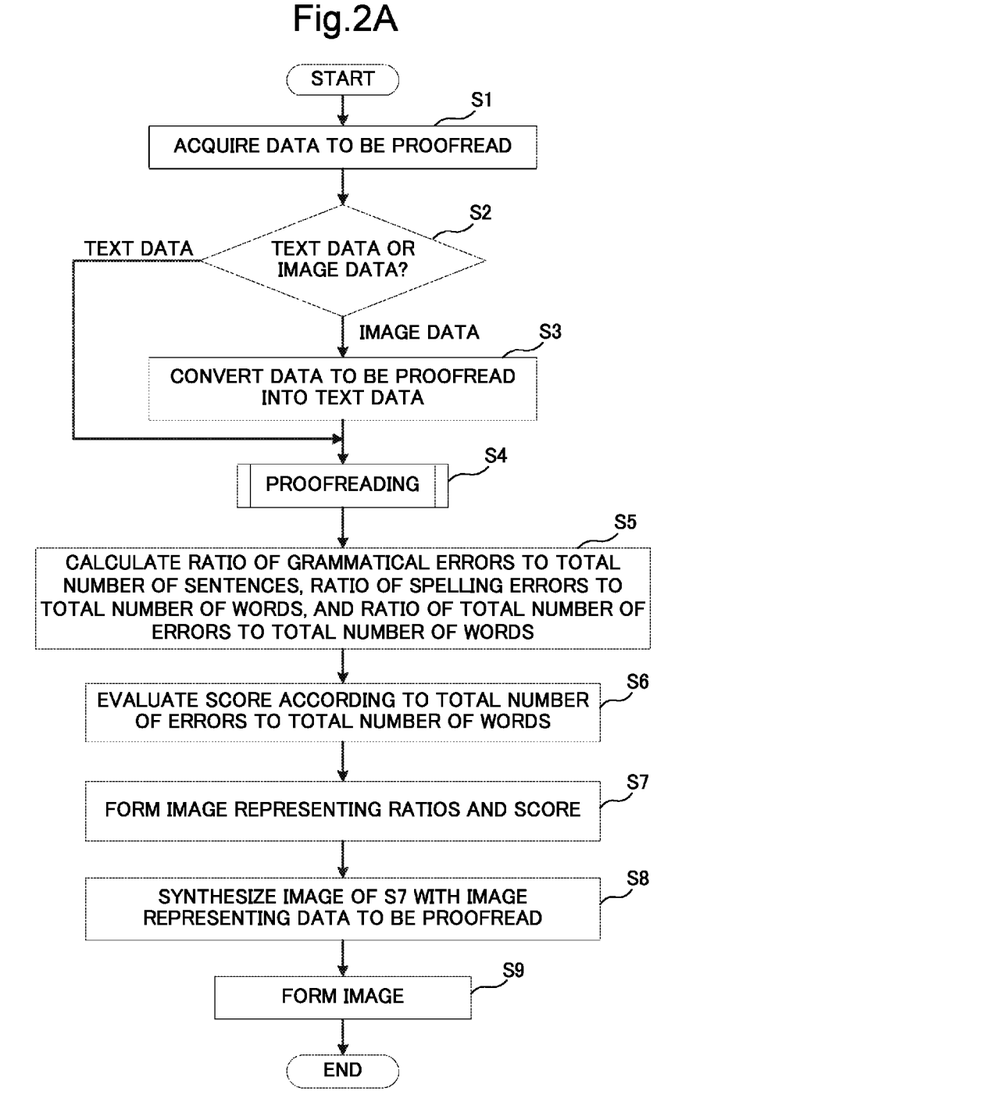
FIG. 2A is a flowchart showing a process performed by the image forming apparatus to generate a proofreading result image.
Figure 2B:
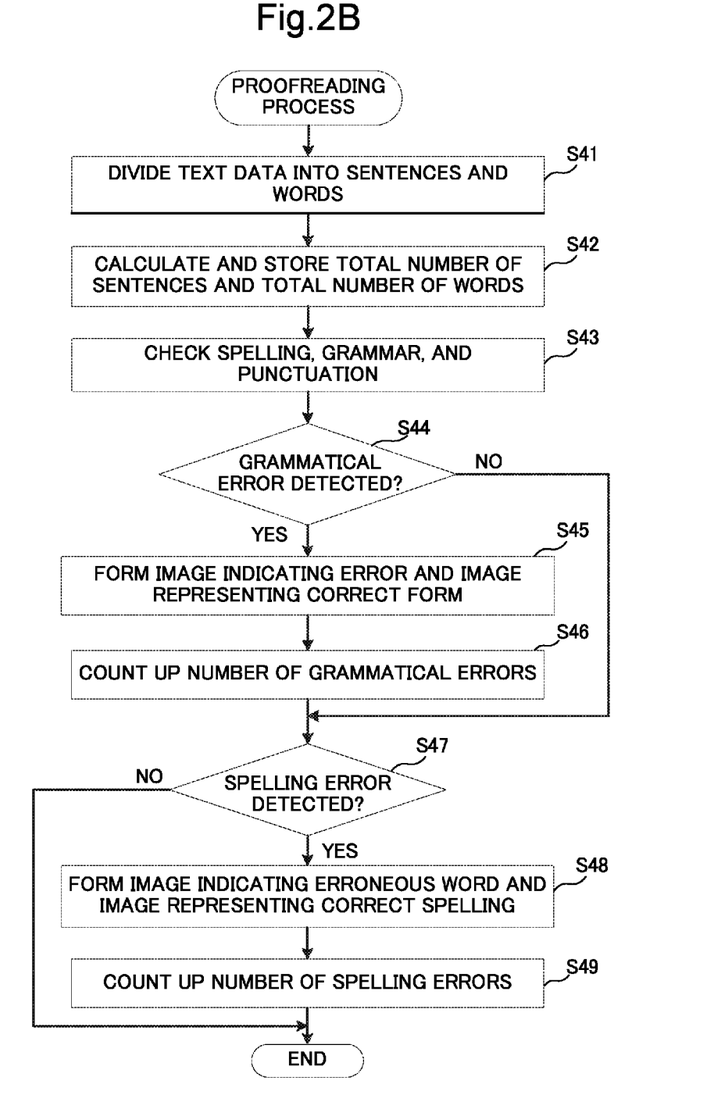
FIG. 2B is a flowchart showing a proofreading process.
Figure 3:
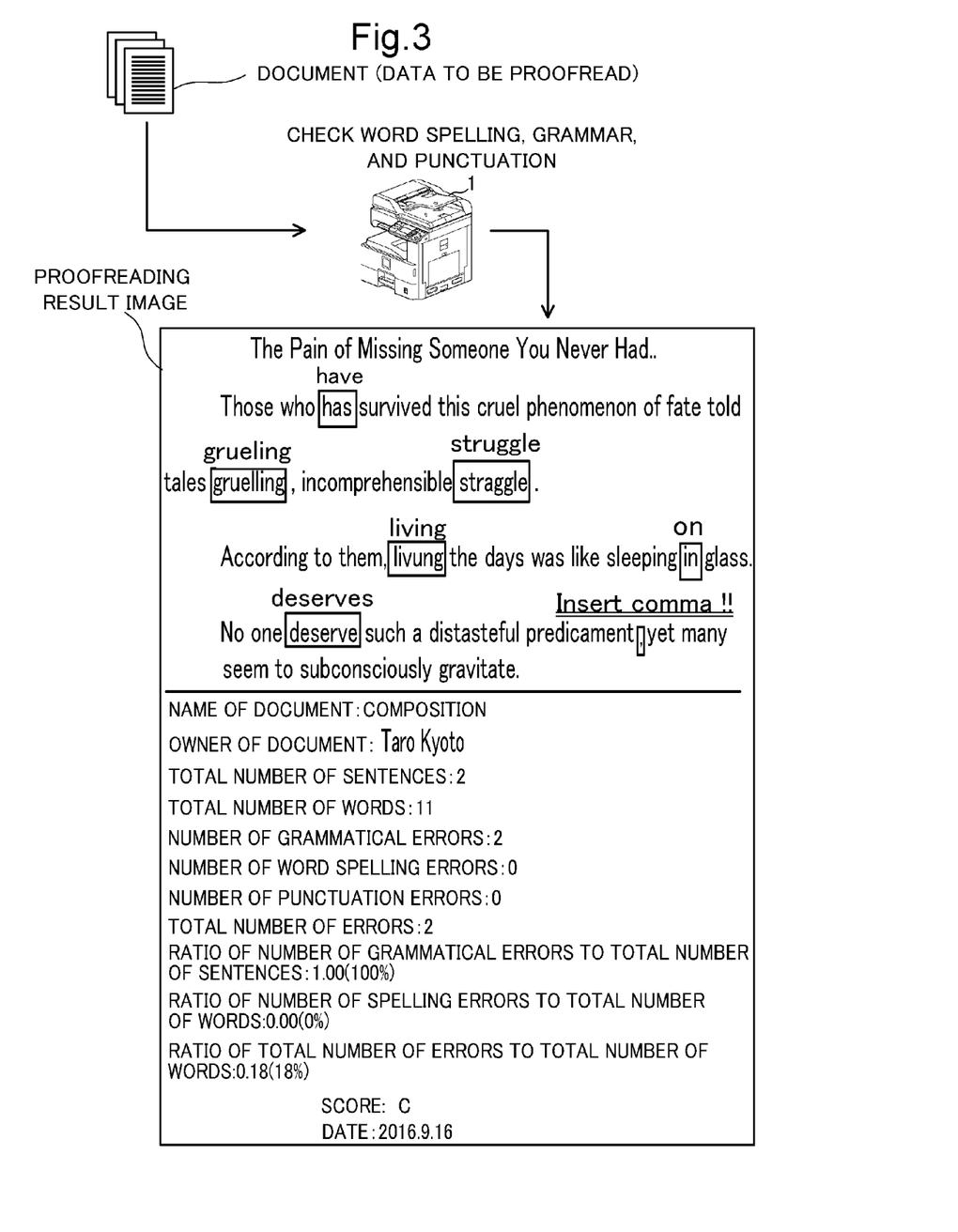
FIG. 3 is a schematic drawing showing the image forming apparatus performing the proofreading, and documents printed by the image forming apparatus.

Hereunder, the proofreading process performed by the image forming apparatus 1 will be described. FIG. 2A is a flowchart showing a process performed by the image forming apparatus 1 to generate the proofreading result image. FIG. 2B is a flowchart showing the proofreading process. FIG. 3 is a schematic drawing showing the image forming apparatus 1 performing the proofreading, and documents printed by the image forming apparatus 1.

The user causes the image reading unit 17 to read the source document containing the sentences to be proofread. Alternatively, the user may connect a USB memory containing image data to be proofread to a USB interface of the communication unit 16, so as to cause the communication unit 16 to read the image data in the USB memory. Further, the user may transmit, from the computer 3 connected to the image forming apparatus 1 via a network, the image data or the text data to be proofread to the image forming apparatus 1, so that the image forming apparatus 1 receives the data through the communication unit 16. The source image read by the image reading unit 17, the image data acquired from the USB memory, or the data acquired from the computer 3 is acquired by the image forming apparatus 1 as data to be proofread, which is the object of the proofreading process (S1). Thus, the image reading unit 17, the USB interface, and the communication unit 16 exemplify the data acquisition unit in the disclosure.

Then the data conversion unit 26 decides whether the data to be proofread acquired as above is image data (jpeg or bmp format) or text data (S2). Upon deciding that the data to be proofread acquired as above is the image data ("image data" at S2), the data conversion unit 26 converts the image data into text data (S3). The data conversion unit 26 corresponding to a part of the data acquisition unit in the disclosure. When the data conversion unit 26 decides that the data to be proofread acquired as above is the text data instead of image data ("text data" at S2), the process of S3 is skipped.

The proofreading processing unit 22 then performs the proofreading process including deciding whether an error is present in the words and the use thereof according to the dictionary rules, with respect to the text data acquired at S1, or the text data converted at S3 (S4).

The proofreading process at S4 will be described in further detail. To perform the proofreading process, the proofreading processing unit 22 divides the data to be proofread, namely the text data, into paragraphs, each of the paragraphs into sentences, and each of the sentences into individual words (S41). At this point, the error ratio calculation unit 24 calculates and stores the total number of sentences and the total number of words (S42).

Then the proofreading processing unit 22 performs word spelling error check, grammatical error check, and punctuation error check according to the dictionary rules, with respect to all the sentences (S43). For example, the proofreading processing unit 22 decides, with respect to each of the sentences, whether an error is contained in each word and the use thereof, whether the singular or plural form of a be-verb following a noun is correct, and whether the tense of an auxiliary verb and a following verb is correct, and whether use of a comma and period is correct.

Upon detecting a grammatical error (YES at S44), the proofreading processing unit 22 forms an image representing the grammatically erroneous part and an image representing a correct form (S45). In addition, the proofreading processing unit 22 increases the count of a grammatical error counter (for example incorporated in the control unit 11) that counts the number of grammatical errors, each time a grammatical error is detected (S46).

Further, when the proofreading processing unit 22 detects a word spelling error (YES at S47), the image generating unit 23 forms an image indicating that the spelling of the word is erroneous, and an image indicating the correct spelling of that word (S48). At the same time, the proofreading processing unit 22 increases the count of a spelling error counter (for example incorporated in the control unit 11) that counts the number of word spelling errors (S49).

When the proofreading process is finished with respect to all the sentences, the error ratio calculation unit 24 calculates the ratio of the number of grammatical errors to the total number of sentences, the ratio of the number of spelling errors to the total number of words, and the ratio of the total number of errors (sum of the number of grammatical errors and the number of spelling errors) to the total number of words, on the basis of the total number of sentences and the total number of words stored at S42, the number counted by the grammatical error counter at S46, and the number counted by the spelling error counter at S49 (S5).

Figure 4:
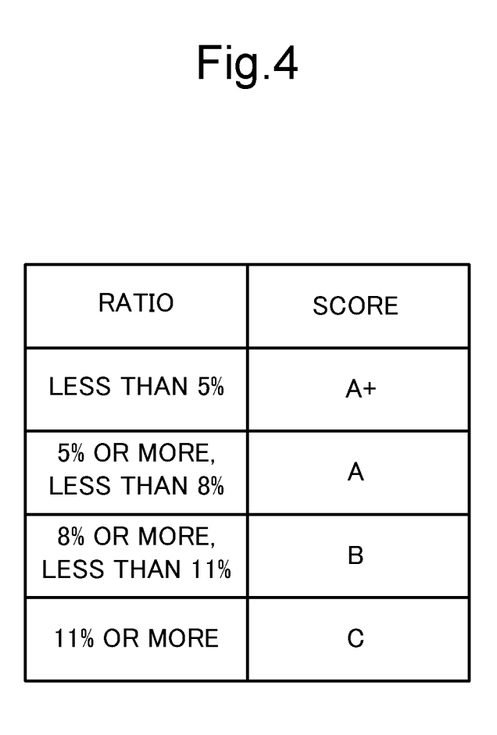
FIG. 4 is a table representing criteria for evaluation.

Further, the error ratio calculation unit 24 calculates the score of the document, on the basis of the value indicating the ratio of the total number of errors to the total number of words (S6). For example, the error ratio calculation unit 24 evaluates the score by looking up a table shown in FIG. 4 to read the value corresponding to the ratio. According to the example of FIG. 4, the scores are indicated by alphabets such as A+, A, B, C, the first being the highest score.

The image generating unit 23 forms an image representing the ratios calculated by the error ratio calculation unit 24 at S5, the name of the document which is the source of the data to be proofread, the origin of the document, the total number of words, the total number of sentences, the number of grammatical errors, the number of word spelling errors, the total number of errors, the ratios calculated at S5, the score evaluated at S6, and the date that the proofreading has been performed (S7).

Then the image generating unit 23 synthesizes the images formed at S7 with the image data formed from the text data representing the data to be proofread, thereby setting up the proofreading result image (S8).

Thereafter, the controller 21 causes the image forming unit 18 to form an image representing the proofreading result image generated as above (S9).

Figure 5:
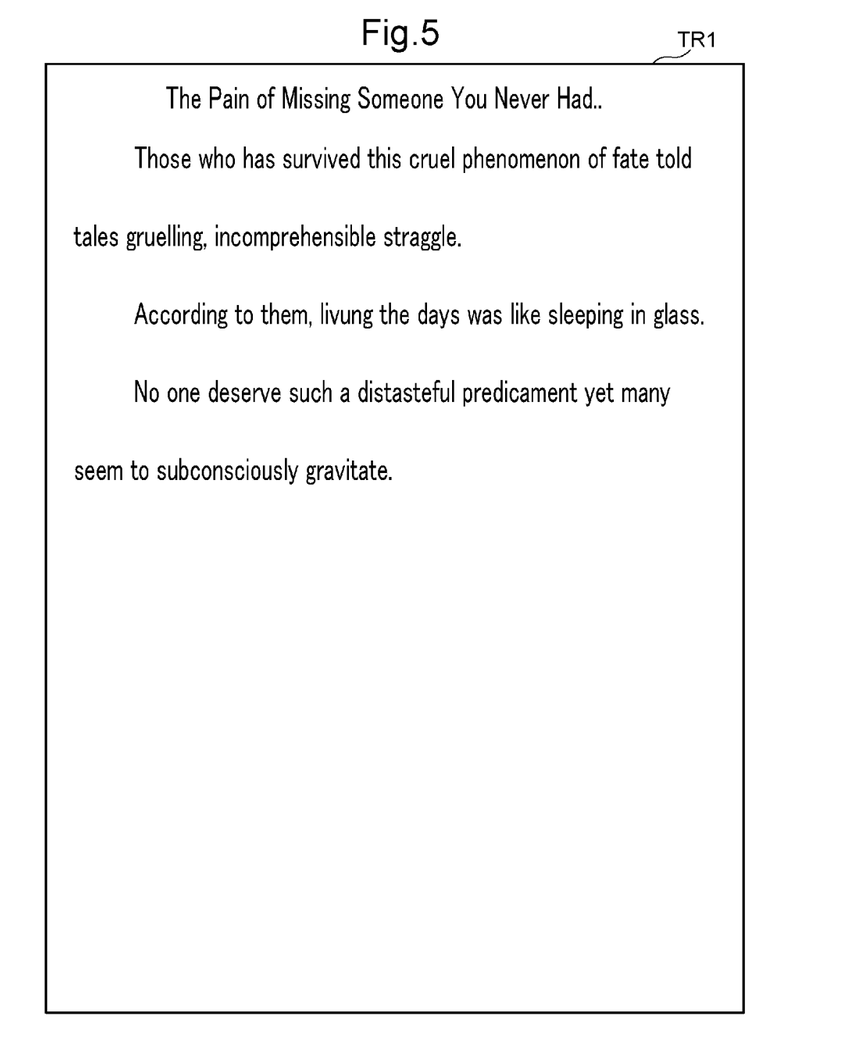
FIG. 5 represents a document including data to be proofread.
Figure 6:
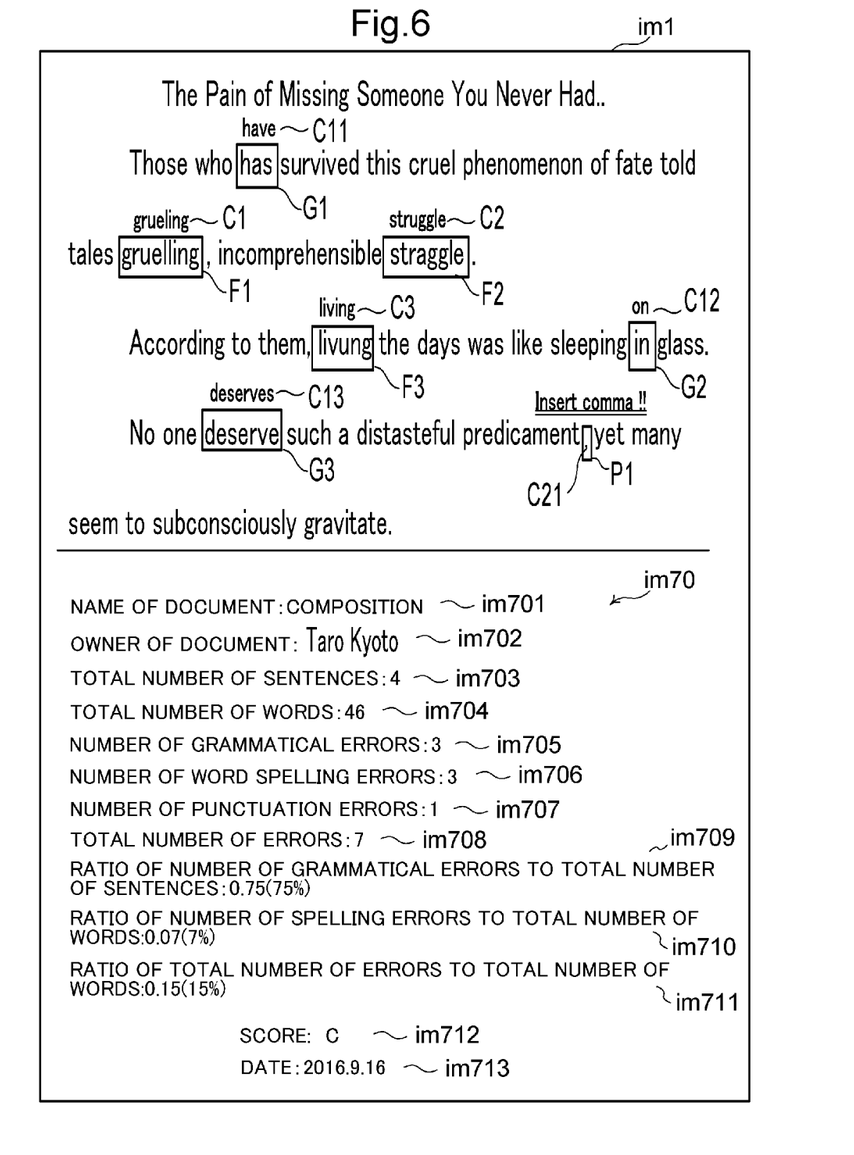
FIG. 6 represents a document including a proofreading result image obtained by proofreading the data to be proofread shown in FIG. 5.

Now, an example of the proofreading result image generated by the image generating unit 23 will be described. FIG. 5 represents a document including the data to be proofread. FIG. 6 represents a document including the proofreading result image obtained by proofreading the data to be proofread shown in FIG. 5.

It will be assumed, for example, that the data to be proofread is an image TR1 representing a composition (text data) shown in FIG. 5, and that the proofreading processing unit 22 has detected word spelling errors, grammatical errors, and punctuation errors. In the example of FIG. 6, the proofreading result image im1 includes, with respect to words from which a spelling error has been detected, images F1 to F3 each indicating that the spelling is erroneous and images C1 to C3 each representing the correctly spelled word, formed close to the erroneously spelled words, the images F1 to F3 and C1 to C3 having been generated by the image generating unit 23. The proofreading result image im1 also includes, with respect to sentences from which a grammatical error has been detected, images G1 to G3 indicating that there is a grammatical error and images C11 to C13 representing the correct form, formed close to the sentences containing the grammatical error. Further, the proofreading result image im1 includes, with respect to a sentence containing a punctuation error, an image P1 indicating the erroneous part and an image C21 representing the correct form, formed close to the sentence containing the error.

Further, in the proofreading result image im1 a score image im70 formed by the image generating unit 23 is synthesized, namely an image im701 indicating the name of the document which is the source of the data to be proofread, an image im702 indicating the origin (owner's name) of the document, an image 703 indicating the total number of sentences, an image im704 indicting the total number of words, an image im705 indicating the number of grammatical errors, an image im706 indicating number of word spelling errors, an image im707 indicating the number of punctuation errors, and an image im708 indicating the total number of errors, images im709 to im711 each indicating the ratio calculated at S5 of FIG. 2, an image 712 indicating the score evaluated at S6 of FIG. 2, and an image im713 indicating the date of the proofreading.

Figure 7:
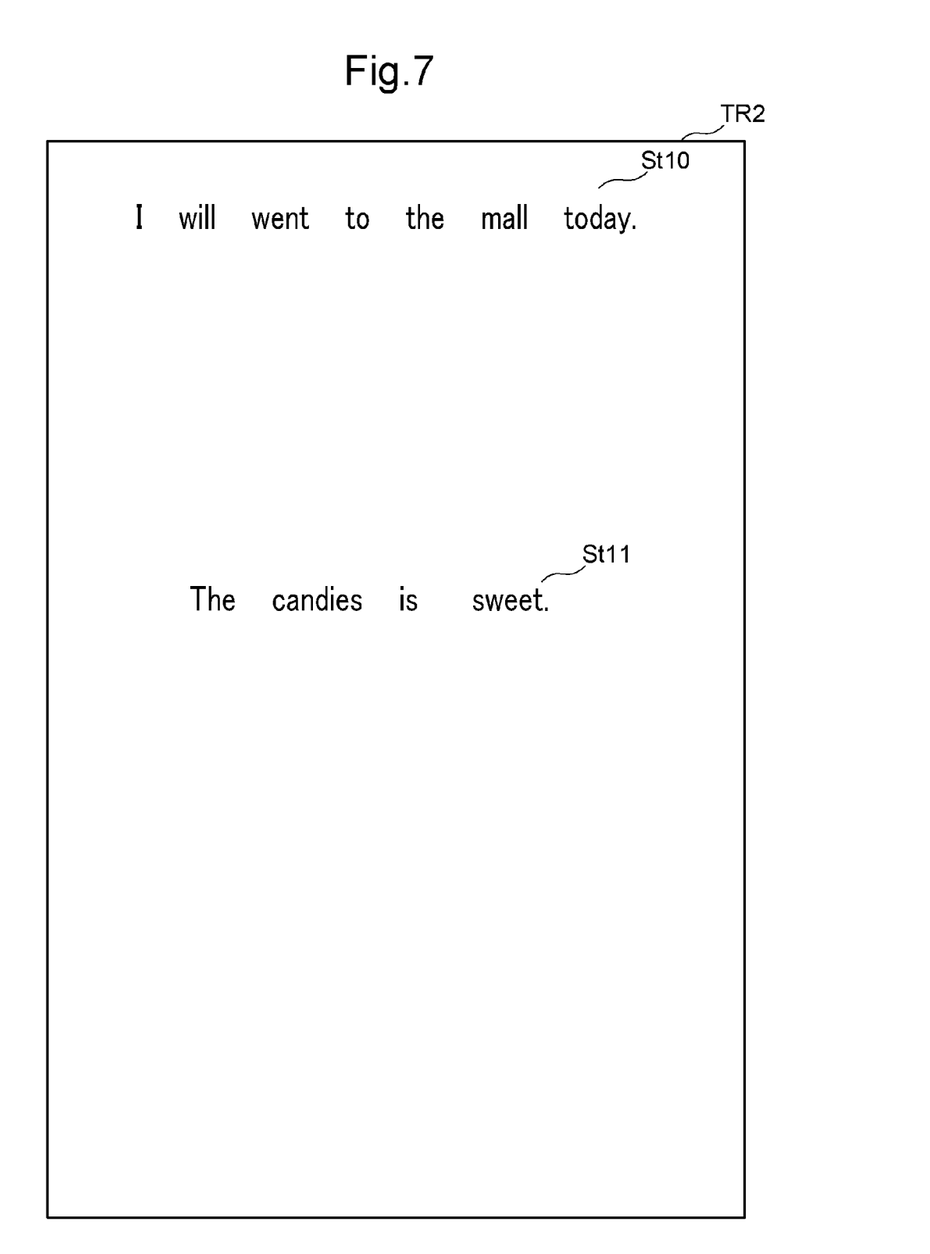
FIG. 7 represents a document including different data to be proofread.
Figure 8:
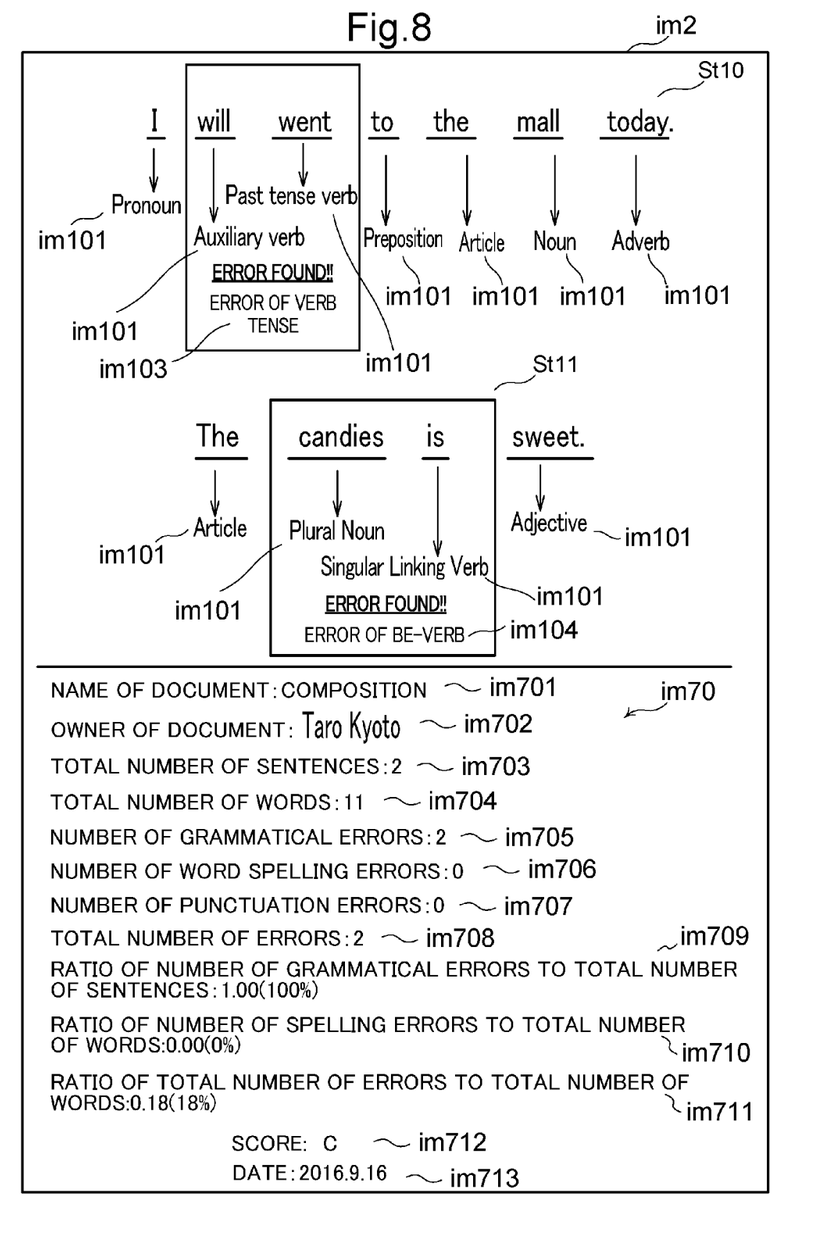
FIG. 8 represents a document including a proofreading result image obtained by proofreading the data to be proofread shown in FIG. 7.

Another example of the proofreading result image generated by the image generating unit 23 will be described. FIG. 7 represents another document including the data to be proofread. FIG. 8 represents a document including the proofreading result image obtained by proofreading the data to be proofread shown in FIG. 7.

It will be assumed, for example, that the data to be proofread is an image TR2 representing a composition (text data) shown in FIG. 7, and that the proofreading processing unit 22 has identified, with respect to the sentences and the words contained in the data to be proofread TR2, the type of violation of rules through the error check at S 43 of FIG. 2 according to the grammatical rules contained in the dictionary rules, and has decided that the violation is the cause of the erroneous writing. In this case, the proofreading processing unit 22 detects the type such as verb or noun, with respect to words contained in sentences St10, St11 as shown in FIG. 8, according to the dictionary rules. The proofreading processing unit 22 further decides, for example, the correctness of the singular or plural form of a be-verb following a noun, the correctness of the tense of an auxiliary verb and a following verb, and so forth.

The image generating unit 23 forms an image im101 and so forth indicating the detection and identification result provided by the proofreading processing unit 22, and synthesizes the images thus formed with the image representing the data to be proofread. For example, the image generating unit 23 forms an image im103 indicating an error of a verb following an auxiliary verb, and an image im104 indicating an error of the singular or plural form of a be-verb following a noun, and synthesizes such images with a proofreading result image im2. In this example also, the image generating unit 23 forms and synthesizes the score image im70, as in the example of FIG. 6.

With the proofreading result image im1 or im2 formed by the image forming unit 18, a teacher exemplifying the user can show the document on which the image is printed to a student, thereby enabling the student to recognize the score of the composition, the erroneous points, and the correct answers for those points. Thus, the configuration according to the foregoing embodiment allows the sentences written on a document to be proofread, and images representing the proofreading result and the correct answers to be easily formed on the document, without the need to employ a complicated hardware structure.

When a school teacher checks the word spelling errors, grammatical errors, and punctuation errors with respect to answers collected from the students, the teacher has to spend a long time to judge the correctness of the answers, and also put down the correct answers. Although the conventional document processor cited above is capable of checking spelling mistakes with respect to the words designated by the user, such a document processor is unable to reduce the time required for both of the correctness judgment and the correction work.

With the image forming apparatus according to the foregoing embodiment, in contrast, sentences written on a document can be proofread, and images representing the proofreading result and the correct answers can be easily formed on the document, without the need to employ a complicated hardware structure.

Further, the configurations and processes of the embodiment described with reference to FIG. 1 to FIG. 8 are merely exemplary, and not intended to limit the scope of the disclosure.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:
a data acquisition unit that acquires data to be proofread representing sentences that are targets of proofreading;
an image forming unit that forms an image on a recording medium; and
a control unit that includes a processor, wherein
by executing an image processing program, the processor functions as:
   a proofreading processing unit that proofreads the data to be proofread acquired by the data acquisition unit, and detects an erroneous writing including an error, and a regular notation representing a correct form of the erroneous writing;
   an error ratio calculation unit that calculates a ratio of a number of the erroneous writings to a total number of words contained in the data to be proofread being an object of a proofreading process performed by the proofreading processing unit, and calculates a score based on the calculated ratio; and
   an image generating unit that synthesizes an image representing the erroneous writing and the regular notation detected through the proofreading process performed by the proofreading processing unit with the data to be proofread, and further synthesizes an image indicating the ratio of the number of the erroneous writings calculated by the error ratio calculation unit and an image indicating the score with a blank space of the data to be proofread, to thereby generate a proofreading result image, and
the image forming unit forms the proofreading result image generated by the image generating unit, on the recording medium.

2. The image forming apparatus according to claim 1, wherein the proofreading processing unit detects a cause of the erroneous writing detected through the proofreading process, and
the image generating unit performs the synthesis by adding an image representing the cause of the erroneous writing detected by the proofreading processing unit to the image representing the erroneous writing, to thereby generate the proofreading result image.

3. The image forming apparatus according to claim 1, further comprising:
an image reading unit that constitutes a part of the data acquisition unit and reads an image on a document; and
a data conversion unit that converts a source image acquired by the image reading unit into text data through OCR process,
wherein the proofreading processing unit proofreads the text data converted by the data conversion unit.

4. The image forming apparatus according to claim 1, wherein the proofreading process performed by the proofreading processing unit includes at least one of spelling error check, grammatical error check, and punctuation error check of an English sentence.

* * * * *